(12) United States Patent
Hüttner et al.

(10) Patent No.: US 7,926,642 B2
(45) Date of Patent: Apr. 19, 2011

(54) DEVICE FOR THE BUFFERING OF OBJECTS

(75) Inventors: Johann Hüttner, Mallersdorf-Pfaffenberg (DE); Martin Seger, Neumarkt (DE); Bernd Fleischmann, Regensburg (DE); Emil Dirmeier, Wolkering (DE)

(73) Assignee: Krones AG, Neutraubling (DE)

( * ) Notice: Subject to any disclaimer, the term of this patent is extended or adjusted under 35 U.S.C. 154(b) by 448 days.

(21) Appl. No.: 11/663,097

(22) PCT Filed: Oct. 6, 2005

(86) PCT No.: PCT/EP2005/010747
§ 371 (c)(1),
(2), (4) Date: Oct. 23, 2007

(87) PCT Pub. No.: WO2006/040058
PCT Pub. Date: Apr. 20, 2006

(65) Prior Publication Data
US 2008/0257685 A1    Oct. 23, 2008

(30) Foreign Application Priority Data

Oct. 16, 2004 (DE) .............. 20 2004 016 069 U

(51) Int. Cl.
*B65G 1/00* (2006.01)
*B65G 47/10* (2006.01)
*B65G 47/46* (2006.01)
*B65G 37/00* (2006.01)

(52) U.S. Cl. .............. 198/347.1; 198/347.2; 198/347.4; 198/353; 198/364

(58) Field of Classification Search ............... 198/347.1, 198/347.2, 347.4, 353, 364
See application file for complete search history.

(56) References Cited

U.S. PATENT DOCUMENTS

| | | | |
|---|---|---|---|
| 1,810,419 A | 6/1931 | Francis |
| 2,788,140 A | 4/1957 | Becker |
| 3,297,138 A | 1/1967 | McCombie |
| 3,575,282 A | 4/1971 | Gaiotto et al. |
| 3,664,487 A | 5/1972 | Ballenger |
| 3,968,861 A | 7/1976 | Kernen |
| 4,018,325 A | 4/1977 | Rejsa |
| 4,153,858 A | 5/1979 | Schylander |
| 4,269,299 A | 5/1981 | Goodman |

(Continued)

FOREIGN PATENT DOCUMENTS

CA    2 364 216 A1    6/2003

(Continued)

OTHER PUBLICATIONS

International Preliminary Report on Patentability for International Application No. PCT/EP2005/010747, dated Apr. 24, 2007.

(Continued)

*Primary Examiner* — Gene Crawford
*Assistant Examiner* — Yolanda Cumbess
(74) *Attorney, Agent, or Firm* — Marshall, Gerstein & Borun LLP

(57) ABSTRACT

A device for the buffering of objects, with two parallel conveyors which can be driven in opposite directions, and with a transfer installation which can be moved by means of at least one linear guide along the conveyors, for the transfer of objects between the conveyors, where at least one linear guide is arranged with separation above a conveyor.

7 Claims, 2 Drawing Sheets

U.S. PATENT DOCUMENTS

| | | | |
|---|---|---|---|
| 4,294,345 A | 10/1981 | Stauber et al. | |
| 4,399,909 A | 8/1983 | Gorelik | |
| 4,413,724 A | 11/1983 | Fellner | |
| 4,468,277 A | 8/1984 | Kontz | |
| 4,469,219 A | 9/1984 | Cosse | |
| 4,513,858 A | 4/1985 | Fellner et al. | |
| 4,549,647 A | 10/1985 | Crosse | |
| 4,565,284 A | 1/1986 | Seragnoli et al. | |
| 4,838,410 A | 6/1989 | Gough | |
| 4,903,823 A | 2/1990 | Plesser et al. | |
| 4,989,718 A | 2/1991 | Steeber | |
| 5,022,609 A | 6/1991 | Cranston | |
| 5,076,422 A | 12/1991 | Clopton | |
| 5,129,506 A | 7/1992 | Gutov et al. | |
| 5,191,959 A | 3/1993 | Leemkuil | |
| 5,413,213 A | 5/1995 | Golz et al. | |
| 5,429,227 A | 7/1995 | Krossmann | |
| 5,490,589 A | 2/1996 | Golz et al. | |
| 5,620,084 A | 4/1997 | Mensch | |
| 5,645,159 A | 7/1997 | Luginbuhl et al. | |
| 5,722,655 A | 3/1998 | Reist | |
| 5,772,005 A | 6/1998 | Hansch | |
| 5,863,571 A | 1/1999 | Santais et al. | |
| 5,996,322 A | 12/1999 | La Barre | |
| 6,079,541 A | 6/2000 | Bercelli et al. | |
| 6,119,848 A | 9/2000 | Hartness, III et al. | |
| 6,152,291 A | 11/2000 | Steeber et al. | |
| 6,168,004 B1 | 1/2001 | Drewitz et al. | |
| 6,182,812 B1 | 2/2001 | Hartness, III et al. | |
| 6,209,716 B1 | 4/2001 | Bogle et al. | |
| 6,230,874 B1 | 5/2001 | Steeber et al. | |
| 6,241,074 B1 | 6/2001 | Steeber | |
| 6,260,688 B1 | 7/2001 | Steeber et al. | |
| 6,334,528 B1 | 1/2002 | Bogle et al. | |
| 6,354,427 B1 | 3/2002 | Pickel et al. | |
| 6,382,398 B2 * | 5/2002 | Steeber et al. | 198/594 |
| 6,394,260 B1 | 5/2002 | Barth et al. | |
| 6,446,781 B1 | 9/2002 | De Villele | |
| 6,497,321 B2 * | 12/2002 | Horton et al. | 198/594 |
| 6,520,318 B1 | 2/2003 | Humele | |
| 6,523,669 B1 | 2/2003 | Steeber et al. | |
| 6,533,103 B2 | 3/2003 | Hartness et al. | |
| 6,550,602 B2 | 4/2003 | Steeber et al. | |
| 6,585,104 B2 | 7/2003 | Horton et al. | |
| 6,591,963 B2 | 7/2003 | Wipf | |
| 6,601,697 B2 | 8/2003 | Steeber et al. | |
| 6,612,420 B1 | 9/2003 | Hartness, III et al. | |
| 6,662,936 B2 | 12/2003 | Ikemoto et al. | |
| 6,698,581 B2 | 3/2004 | Steeber et al. | |
| 6,725,997 B2 | 4/2004 | Draghetti | |
| 6,725,998 B2 | 4/2004 | Steeber et al. | |
| 6,761,264 B2 | 7/2004 | Steeber et al. | |
| 6,779,651 B1 | 8/2004 | Linglet et al. | |
| 6,817,464 B2 | 11/2004 | Biondi et al. | |
| 6,846,145 B2 | 1/2005 | Remericq | |
| 6,848,563 B2 | 2/2005 | Abert et al. | |
| 6,896,120 B2 | 5/2005 | Barry et al. | |
| 6,959,953 B2 | 11/2005 | Graffin | |
| 6,973,767 B2 | 12/2005 | Wagner et al. | |
| 7,021,452 B2 | 4/2006 | Horton et al. | |
| 7,032,742 B2 | 4/2006 | Hartness et al. | |
| 7,140,870 B2 | 11/2006 | Nava | |
| 7,191,896 B2 | 3/2007 | Hartness et al. | |
| 7,219,788 B2 | 5/2007 | Tuck et al. | |
| 7,264,113 B2 | 9/2007 | Hartness et al. | |
| 7,278,531 B2 | 10/2007 | Hartness et al. | |
| 7,299,832 B2 | 11/2007 | Hartness et al. | |
| 7,311,515 B2 | 12/2007 | Netsu | |
| 7,331,156 B2 | 2/2008 | Hartness et al. | |
| 7,334,677 B2 | 2/2008 | Mader | |
| 7,413,072 B2 | 8/2008 | Horton et al. | |
| 7,431,142 B2 | 10/2008 | Eberle | |
| 7,442,031 B2 | 10/2008 | Netsu | |
| 2002/0053499 A1 | 5/2002 | Zurcher | |
| 2002/0144880 A1 | 10/2002 | Ikemoto et al. | |
| 2002/0195317 A1 | 12/2002 | Wipf | |
| 2003/0085103 A1 | 5/2003 | Horton et al. | |
| 2003/0155212 A1 | 8/2003 | Abert et al. | |
| 2007/0235288 A1 | 10/2007 | Horton et al. | |
| 2008/0142336 A1 | 6/2008 | Kronseder et al. | |
| 2008/0210520 A1 | 9/2008 | Legallais | |
| 2008/0223691 A1 | 9/2008 | Nishi et al. | |

FOREIGN PATENT DOCUMENTS

| | | |
|---|---|---|
| DE | 1080580 | 4/1960 |
| DE | 26 10 833 A1 | 9/1977 |
| DE | 26 18 905 A1 | 11/1977 |
| DE | 19824846 | 12/1999 |
| DE | 19928325 | 12/2000 |
| DE | 29913237 | 12/2000 |
| DE | 102004053663 | 8/2005 |
| DE | 202006003690 | 6/2006 |
| DE | 102006120148 | 9/2007 |
| EP | 0506551 | 9/1992 |
| EP | 0581143 | 2/1994 |
| EP | 0734978 | 10/1996 |
| EP | 1161391 | 12/2001 |
| EP | 1275603 | 1/2003 |
| EP | 1295820 | 3/2003 |
| EP | 1 389 595 A1 | 2/2004 |
| EP | 1832533 | 9/2007 |
| FR | 2 745 804 A1 | 9/1997 |
| FR | 2766803 | 2/1999 |
| GB | 1301843 | 1/1973 |
| GB | 2047667 | 12/1980 |
| GB | 2143788 | 2/1985 |
| GB | 2300613 | 11/1996 |
| JP | 61197376 | 9/1986 |
| JP | 7046977 | 2/1995 |
| RU | 2160694 | 12/2000 |
| RU | 2198835 | 2/2003 |
| WO | WO-97/09257 | 3/1997 |
| WO | WO-00/43294 | 7/2000 |
| WO | WO-01/10754 | 2/2001 |
| WO | WO-01/98187 | 12/2001 |
| WO | WO 02/072454 A1 | 9/2002 |
| WO | WO-2005/073113 | 8/2005 |
| WO | WO-2007/025598 | 3/2007 |

OTHER PUBLICATIONS

Anonymous, "Paternoster lift, also known as the cyclic elevator", 3 pp., Retrieved from the Internet on Apr. 18, 2008: http:www.dartfordarchive.org/uk/technology/magnified/cyclic_elev.htm.

Anonymous, "Paternoster", 7 pp., Retrieved from the Internet on Apr. 28, 2008: http://en.wikipedia.org/wiki/Paternoster.

Dynac 6000 Series Brochure, Hartness International, Greenville, South Carolina, United States (2 pp.), understood to have been publicly available at least as early as Nov. 2, 2004.

Dynac 7000 Series General Specification Brochure 2002, Hartness International, Greenville, SC, US (2 pp.).

Dynac Model 6400 Series General Specification Brochure, 2002, Hartness International, Greenville, SC, US (2 pp.).

Dynac Model 7000 Brochure, Hartness International, Greenville, South Carolina, United States (2 pp.), understood to have been publicly available at least as early as Nov. 2, 2004.

International Preliminary Report on Patentability or International Application No. PCT/EP2005/000942 (Oct. 3, 2006).

International Preliminary Report on Patentability for International Application No. PCT/EP2006/0006648 (Apr. 15, 2008).

International Preliminary Report on Patentability for International Application No. PCT/EP2007/000485 (Nov. 4, 2008).

International Preliminary Report on Patentability for International Application No. PCT/EP2007/005824 (Feb. 17, 2009).

International Search Report and Written Opinion for International Application No. PCT/EP2005/000942 (Sep. 30, 2005).

International Search Report and Written Opinion for International Application No. PCT/EP2005/010747 (Nov. 21, 2005).

International Search Report and Written Opinion for International Application No. PCT/EP2006/0006648 (Sep. 25, 2006).

International Search Report and Written Opinion for International Application No. PCT/EP2007/000485 (May 7, 2007).

International Search Report and Written Opinion for International Application No. PCT/EP2007/005824 (Oct. 8, 2007).

Non-final Office Action for U.S. Appl. No. 10/588,046 (Nov. 21, 2008).
Final Office Action for U.S. Appl. No. 10/588,046 (Jun. 8, 2009).
International Search Report and Written Opinion for International Application No. PCT/EP2007/000305 (Apr. 19, 2007).

International Preliminary Report on Patentability for International Application No. PCT/EP2007/000305 (Oct. 14, 2008).

* cited by examiner

DEVICE FOR THE BUFFERING OF OBJECTS

CROSS-REFERENCE TO RELATED APPLICATION

This is the U.S. national stage under 35 U.S.C. §371, of international application no. PCT/EP2005/010747, having an international filing date of Oct. 6, 2005, and claims priority to German application no. 20 2004 016 069.2 filed on Oct. 16, 2004.

FIELD OF THE DISCLOSURE

The disclosure relates to a device for the buffering of objects, such as objects, e.g. bottles in processing operations, transferred on and between conveyors.

BACKGROUND OF THE DISCLOSURE

Such a device is already known, in which the transfer installation is mounted between the two conveyors in a manner which allows it to be moved (U.S. Pat. No. 4,569,647). This leads to the device taking up a large amount of space, in comparison to the buffering capacity. In addition, special turntables, conveyor belts, or similar devices are required, which bridge the separation between the two conveyors and form potential attachment points for the objects.

Furthermore, a device is known for the buffering of objects, in which the two conveyors moving in opposite directions run immediately next to each other, and the conveyors are attached in a linear guide in the form of one or two support belts (U.S. Pat. No. 6,585,104). Here, the objects can be shifted without additional support immediately from one conveyor to the other. However, here too large of a construction width, resulting from the lateral support belts for the transfer installation, constitutes a disadvantage, and the belts make the conveyors difficult to access and susceptible to damage by shards or similar pieces on the conveyors.

SUMMARY OF THE DISCLOSURE

The disclosure is based on the problem of producing a device for the buffering of objects, which, while having a compact design, allows the breakdown-free transfer of objects, and presents a well protected linear guide for the transfer installation.

In a buffer according to the disclosure, no space needs to be provided between the conveyors for mounting the transfer installation; thus, the conveyors can be arranged closely next to each other. There is also no need for space to attach the transfer installation to the side of the conveyors. Because their linear guides are located above the conveyors, they are protected well against the action of shards, liquids, etc.

BRIEF DESCRIPTION OF THE DRAWINGS

Below, an embodiment example of the disclosure is described with reference to the drawings. In the drawings.

DETAILED DESCRIPTION OF THE DISCLOSURE

Figure 1:
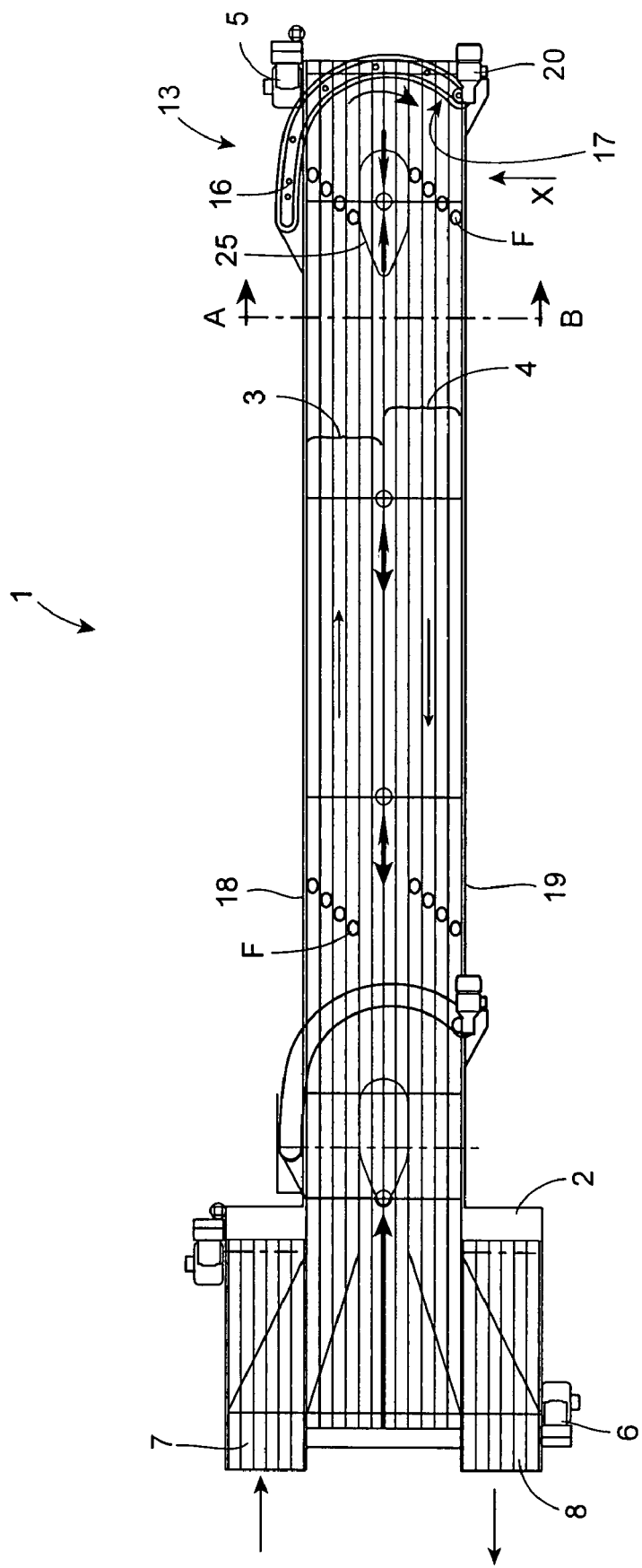
FIG. 1 shows the schematic top view of a device for the buffering of objects.
Figure 2:
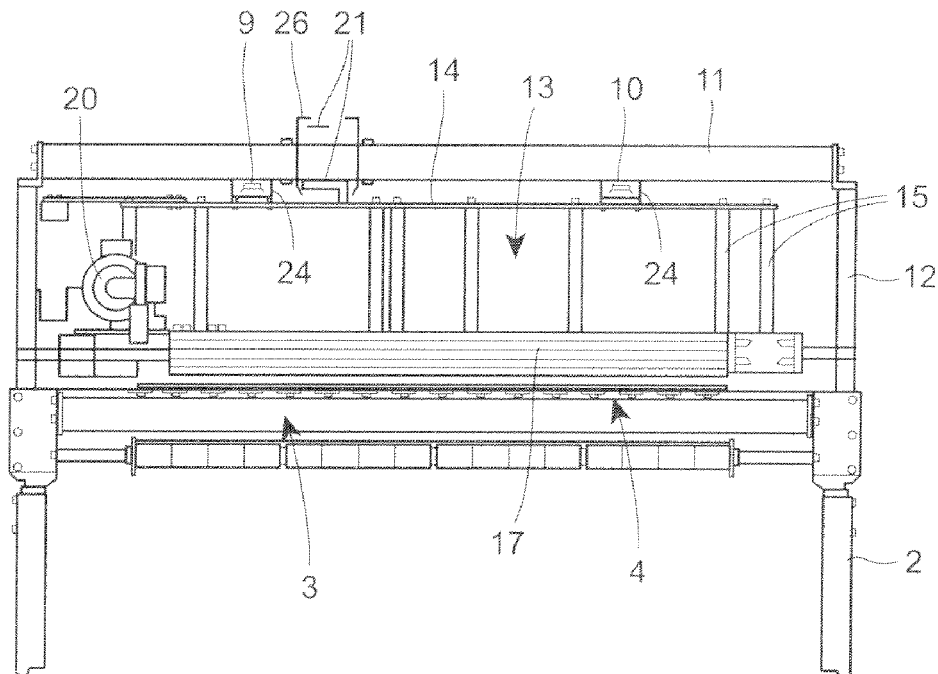
FIG. 2 shows the cross section A-B according to FIG. 1.
Figure 3:
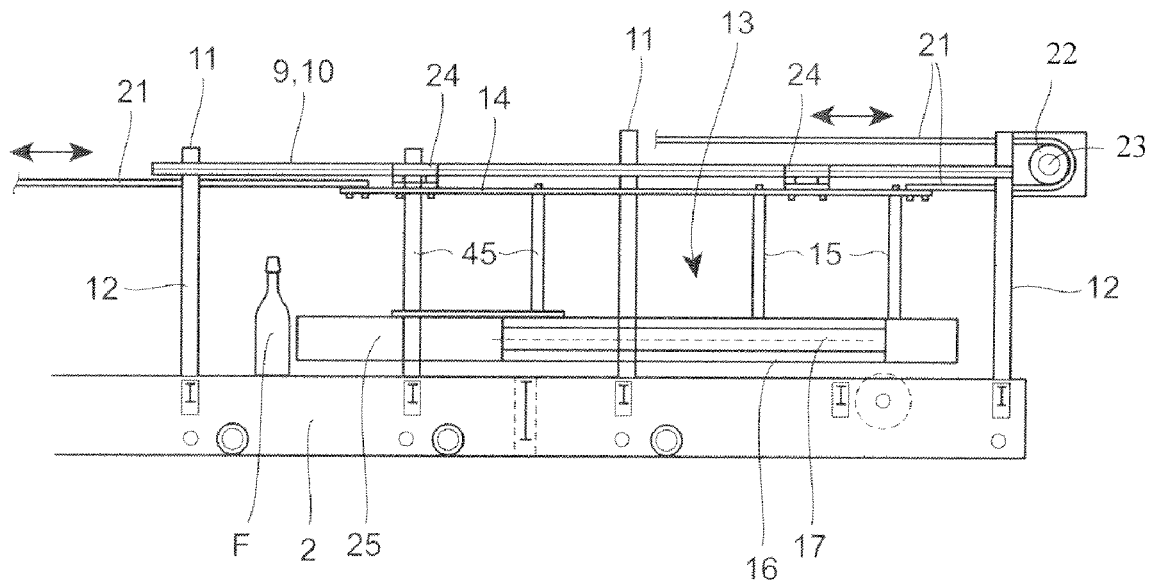
FIG. 3 shows the view X according to FIG. 1.

The installation 1 according to FIGS. 1-3 presents a frame 2, on whose horizontal upper side a first linear conveyor 3 and a second linear conveyor 4 are arranged, in parallel and without significant separation between them. The two conveyors 3, 4 are formed from several parallel, endless conveyor belts, or hinged slat chains, or a modular conveyor belt of appropriate width. The first conveyor 3 presents a motor 5, by means of which it can be driven in the direction of the arrow between a rest position and a maximum speed in a continuously variable way. The second conveyor 4 presents a motor 6, by means of which it can also be driven in the direction of the arrow between a rest position and a maximum speed in a continuously variable way. If both conveyors 3, 4 are running, then their transport directions are opposite.

The objects which have to be transported in multiple rows, in this case standing bottles F, are transferred by a feed conveyor 7 to the first conveyor 3, and taken over from the second conveyor 4 by a delivery conveyor 8. Because the two conveyors 3 and 4 run in opposite directions, the feed conveyor 7 and the delivery conveyor 8 are connected on the same front side, in the present case on the left front side of the device 1.

Above the two conveyors 3, 4, two parallel, horizontal linear guides 9, 10 in the shape of profiled rails (T-profile) are arranged with a separation which is greater than the maximum height of the bottles F. One linear guide 9 is located approximately in the middle above the conveyor 3; the other linear guide 10 is located approximately in the middle above the conveyor 4. Both linear guides 9, 10 are attached on the bottom side of horizontal cross bars 11, which in turn are supported by means of vertical stands 12 on the frame 2.

On the two linear guides 9, 10, by means of four shoes 24 which enclose the profiled rails, a transfer installation 13 can be moved in both directions, like a sled, along the two conveyors 3, 4.

The transfer installation 13 presents a horizontal base plate 14, to whose bottom sides an arc-like guide 16 for an endless conveyor belt 17 is mounted by means of several vertical rods 15.

The conveyor belt 17 runs, with some separation, above the two conveyors 3, 4 at approximately the height of the body of the bottle, in the shape of an arc from the exterior of the conveyor 3 to the exterior of the conveyor 4, where the bottles F in each case are led through a stationary railing 18, 19. By means of the conveyor belt 17, which is driven by its own motor 20 in the direction of the arrow, the bottles F that arrive from the conveyor 3 are deflected over the narrow slit between the conveyor 3 and the conveyor 4 without any additional support on the conveyor 4.

In addition, on the bottom side of the base plate 14, a torpedo-shaped guide body 25 is attached with separation above the conveyors 3, 4 by means of additional vertical rods 15. In the area of the transfer installation 13, the guide body 25 provides additional guidance and stabilization for the bottles F, so that the latter are deflected, without breakdown, from the conveyor 3 to the conveyor 4 which runs in the opposite direction.

As shown in FIG. 1, the transfer installation 13 can be moved between a left end position with minimal buffering capacity and a right end position with maximum buffering capacity in both directions. The transfer installation 13 is driven by a toothed belt 21, which is attached to the base plate 14 of the transfer installation 13 and which circulates, on the one hand, over a deflection roller—not shown—in the inlet/outlet area, and, on the other hand, over a driving roller 22 with a motor 23. The toothed belt 21 is guided by means of guide rails 26 which are attached to the cross bars 11 to prevent sagging.

The above-described transfer installation 13, under all the operating conditions of the buffer, produces a gentle, breakdown-free transfer of the bottles F from the first conveyor 3 to the conveyor 4 which runs in the opposite direction. This also applies to the operating situations in which one of the two conveyors is not moving and the other is running at maximum speed, and the transfer installation 13 is moving at maximum speed. Here, the bottles F are taken off the immobile first conveyor 3 and transferred to the running second conveyor 4, or they are taken over by the running first conveyor 3 and deposited on the immobile second conveyor 4.

The motors 5, 6, 20 and 23 are driven by means of an electronic control device, which is not shown, at the appropriate rpm and in the appropriate direction of rotation in each case. The control device monitors the operational status of the feed conveyor 7 and of the delivery conveyor 8 and/or of the downstream or upstream treatment machine.

What is claimed is:

1. A device for the buffering of objects, comprising:
   two parallel conveyors drivable in opposite directions,
   a transfer installation movable by means of at least one linear guide along the two parallel conveyors, for the transfer of objects between the conveyors, and wherein the at least one linear guide is arranged with separation above the conveyors,
   wherein each of the at least one linear guides comprises a profiled rail, said transfer installation is attached on said profiled rail in a manner which allows the transfer installation to be moved by means of at least one shoe.

2. The device according to claim 1, wherein the at least one linear guide includes two parallel linear guides one of the linear guides being arranged approximately in the middle above one of the conveyors, and the other linear guide being arranged approximately in the middle above the other conveyor.

3. The device according to claim 1, wherein the transfer installation comprises a base plate, and the at least one linear guide is located on the upper side of the base plate, and at least one guide for the objects is located on the lower side of the base plate.

4. The device according to claim 3, wherein a drivable, endless conveyor belt for the objects runs above the at least one guide.

5. The device according to claim 1, wherein the transfer installation comprises an arc-shaped guide which extends from an exterior of a conveyor to an exterior of the other conveyor.

6. The device according to claim 1, wherein the transfer installation comprises a torpedo-shaped guide body for the objects, the torpedo-shaped guide body being arranged approximately in the middle above the separation place between the two conveyors.

7. The device according to claim 1, wherein a flexible drive means for the transfer installation is arranged, with separation, above a conveyor.

* * * * *